(12) United States Patent
Ogawa

(10) Patent No.: US 9,384,077 B2
(45) Date of Patent: Jul. 5, 2016

(54) STORAGE CONTROL APPARATUS AND METHOD FOR CONTROLLING STORAGE APPARATUS

(71) Applicant: FUJITSU LIMITED, Kawasaki-shi, Kanagawa (JP)

(72) Inventor: Junichi Ogawa, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 14/476,003

(22) Filed: Sep. 3, 2014

(65) Prior Publication Data

US 2015/0143183 A1 May 21, 2015

(30) Foreign Application Priority Data

Nov. 19, 2013 (JP) .................................. 2013-239258

(51) Int. Cl.
*G06F 11/07* (2006.01)
*G06F 1/20* (2006.01)
*G06F 3/06* (2006.01)

(52) U.S. Cl.
CPC .............. *G06F 11/0727* (2013.01); *G06F 1/20* (2013.01); *G06F 3/0614* (2013.01); *G06F 3/0653* (2013.01); *G06F 3/0683* (2013.01); *G06F 11/0757* (2013.01)

(58) Field of Classification Search
CPC ............ G06F 11/0727; G06F 11/0757; G06F 11/008; G06F 11/3058; G06F 11/0793; G06F 1/3287; G06F 1/3203; G06F 3/0614; G06F 3/0653
See application file for complete search history.

(56) References Cited

U.S. PATENT DOCUMENTS

| 8,374,731 | B1* | 2/2013 | Sullivan | ............... F24F 11/0079 361/695 |
| 8,416,571 | B2* | 4/2013 | Mizumura | ......... H05K 7/20836 361/679.48 |
| 8,904,201 | B2* | 12/2014 | Matsubara | .............. G06F 1/206 236/49.1 |
| 2009/0266511 | A1* | 10/2009 | Yang | .................... G11B 33/144 165/80.2 |
| 2012/0140402 | A1* | 6/2012 | Mizumura | ......... H05K 7/20836 361/679.33 |
| 2014/0111932 | A1* | 4/2014 | Fukuda | ................ G11B 33/128 361/679.33 |

FOREIGN PATENT DOCUMENTS

| JP | 2004-207450 | 7/2004 |
| JP | 2008-208806 | 9/2008 |
| JP | 2009-003665 | 1/2009 |
| JP | 2012-094214 | 5/2012 |

* cited by examiner

*Primary Examiner* — Nadeem Iqbal
(74) *Attorney, Agent, or Firm* — Staas & Halsey LLP

(57) ABSTRACT

A storage control apparatus for controlling a storage apparatus including inside a casing thereof one or more storage units and two or more fans for cooling the storage units includes a processor. The processor is configured to obtain abnormality information regarding abnormalities in access in each of the storage units. The processor is configured to switch a control state between a first control state and a second control state. The first control state corresponds to a first combination of operation modes of the fans. The second control state corresponds to a second combination of operation modes of the fans. The second combination is different from the first combination. The processor is configured to detect, among the fans, a first fan that is related to an abnormality in the storage units on basis of first abnormality information for the first control state and second abnormality information for the second control state.

11 Claims, 17 Drawing Sheets

| OPERATION PATTERN | FAN A OPERATION MODE | FAN B OPERATION MODE | FAN C OPERATION MODE | FAN D OPERATION MODE |
|---|---|---|---|---|
| P1 | LOW SPEED | LOW SPEED | NORMAL | NORMAL |
| P2 | LOW SPEED | NORMAL | LOW SPEED | NORMAL |
| P3 | LOW SPEED | NORMAL | NORMAL | LOW SPEED |
| P4 | NORMAL | LOW SPEED | LOW SPEED | NORMAL |
| P5 | NORMAL | LOW SPEED | NORMAL | LOW SPEED |
| P6 | NORMAL | NORMAL | LOW SPEED | LOW SPEED |
| P7 | LOW SPEED | LOW SPEED | LOW SPEED | NORMAL |
| P8 | LOW SPEED | LOW SPEED | NORMAL | LOW SPEED |
| P9 | LOW SPEED | LOW SPEED | LOW SPEED | LOW SPEED |
| P10 | STOPPED | LOW SPEED | NORMAL | NORMAL |
| ... | ... | ... | ... | ... |

| OPERATION PATTERN | FAN A OPERATION MODE | FAN B OPERATION MODE | FAN C OPERATION MODE | FAN D OPERATION MODE | APPARATUS INTERNAL TEMPERATURE |
|---|---|---|---|---|---|
| P01 | NORMAL | NORMAL | NORMAL | NORMAL | T0 |
| P02 | STOPPED | NORMAL | NORMAL | NORMAL | T1 |
| P03 | NORMAL | STOPPED | NORMAL | NORMAL | T1 |
| P04 | NORMAL | NORMAL | STOPPED | NORMAL | T1 |
| P05 | NORMAL | NORMAL | NORMAL | STOPPED | T1 |
| P06 | LOW SPEED | NORMAL | NORMAL | NORMAL | T2 |
| P07 | NORMAL | LOW SPEED | NORMAL | NORMAL | T2 |
| P08 | NORMAL | NORMAL | NORMAL | LOW SPEED | T2 |
| P09 | LOW SPEED | LOW SPEED | NORMAL | NORMAL | T2 |
| P010 | LOW SPEED | NORMAL | LOW SPEED | NORMAL | T3 |
| ... | ... | ... | ... | ... | ... |

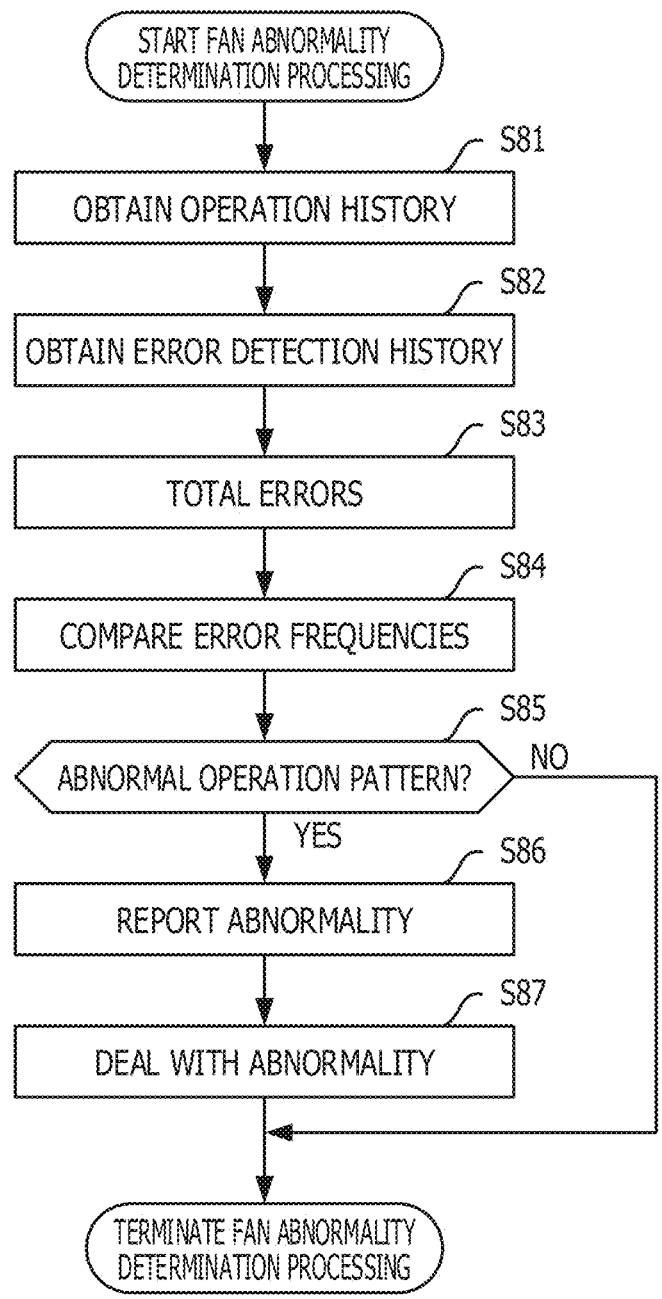

FIG. 16

| OPERATION PATTERN | OPERATION PERIOD | NUMBER OF TIMES ERROR HAS OCCURRED | ERROR FREQUENCY |
|---|---|---|---|
| P01 | OT1 | ET1 | EF1 |
| P02 | OT2 | ET2 | EF2 |
| P03 | OT3 | ET3 | EF3 |
| P04 | OT4 | ET4 | EF4 |
| ... | ... | ... | ... |

STORAGE CONTROL APPARATUS AND METHOD FOR CONTROLLING STORAGE APPARATUS

CROSS-REFERENCE TO RELATED APPLICATION

This application is based upon and claims the benefit of priority from the prior Japanese Patent Application No. 2013-239258 filed on Nov. 19, 2013, the entire contents of which are incorporated herein by reference.

FIELD

The embodiments discussed herein are related to a storage control apparatus and a method for controlling a storage apparatus.

BACKGROUND

With the increasing recording density of disk drives in recent years, the effect of extraneous vibrations on the access performance of disk drives has been increasing. Sometimes a cooling fan included in a storage apparatus is one source of such extraneous vibrations. An abnormal vibration is generated in the storage apparatus due to malfunction or faulty assembly of the cooling fan and the access performance of the disk drive is decreased due to the occurrence of abnormalities such as a write off-track error. Such abnormalities are sometimes a hindrance to a data saving function of a redundant array of inexpensive/independent disks (RAID) and there is a demand to detect such faults in cooling fans.

Many storage apparatuses monitor the rotational speed of a cooling fan in order to maintain cooling performance but not to detect extraneous vibrations. However, there are storage apparatuses capable of detecting extraneous vibrations, for example, by using an acceleration sensor mounted therein.

Related techniques are disclosed in, for example, Japanese Laid-open Patent Publication No. 2012-94214, Japanese Laid-open Patent Publication No. 2009-3665, Japanese Laid-open Patent Publication No. 2008-208806, and Japanese Laid-open Patent Publication No. 2004-207450.

Extraneous vibrations in storage apparatuses do not necessarily cause the access performance of the disk drive to be reduced. Consequently, excessive detection of abnormalities leads to a reduction in cooling performance due to disconnection of normal cooling fans and to a reduction in the reliability of abnormality reports due to excessive reporting of abnormalities.

SUMMARY

According to an aspect of the present invention, provided is a storage control apparatus for controlling a storage apparatus including inside a casing thereof one or more storage units and two or more fans for cooling the storage units. The storage control apparatus includes a processor. The processor is configured to obtain abnormality information regarding abnormalities in access in each of the storage units. The processor is configured to switch a control state between a first control state and a second control state. The first control state corresponds to a first combination of operation modes of the fans. The second control state corresponds to a second combination of operation modes of the fans. The second combination is different from the first combination. The processor is configured to detect, among the fans, a first fan that is related to an abnormality in the storage units on basis of first abnormality information for the first control state and second abnormality information for the second control state.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of an operation pattern table according to a second embodiment;

FIG. 14 is a diagram illustrating an example of an operation pattern table according to a third embodiment;

FIG. 15 is a diagram illustrating a flowchart of fan abnormality determination processing according to a third embodiment;

FIG. 16 is a diagram illustrating an example of an error counting table according to a third embodiment.

DESCRIPTION OF EMBODIMENTS

Hereafter, embodiments will be described in detail with reference to the drawings.

First Embodiment

Figure 1:
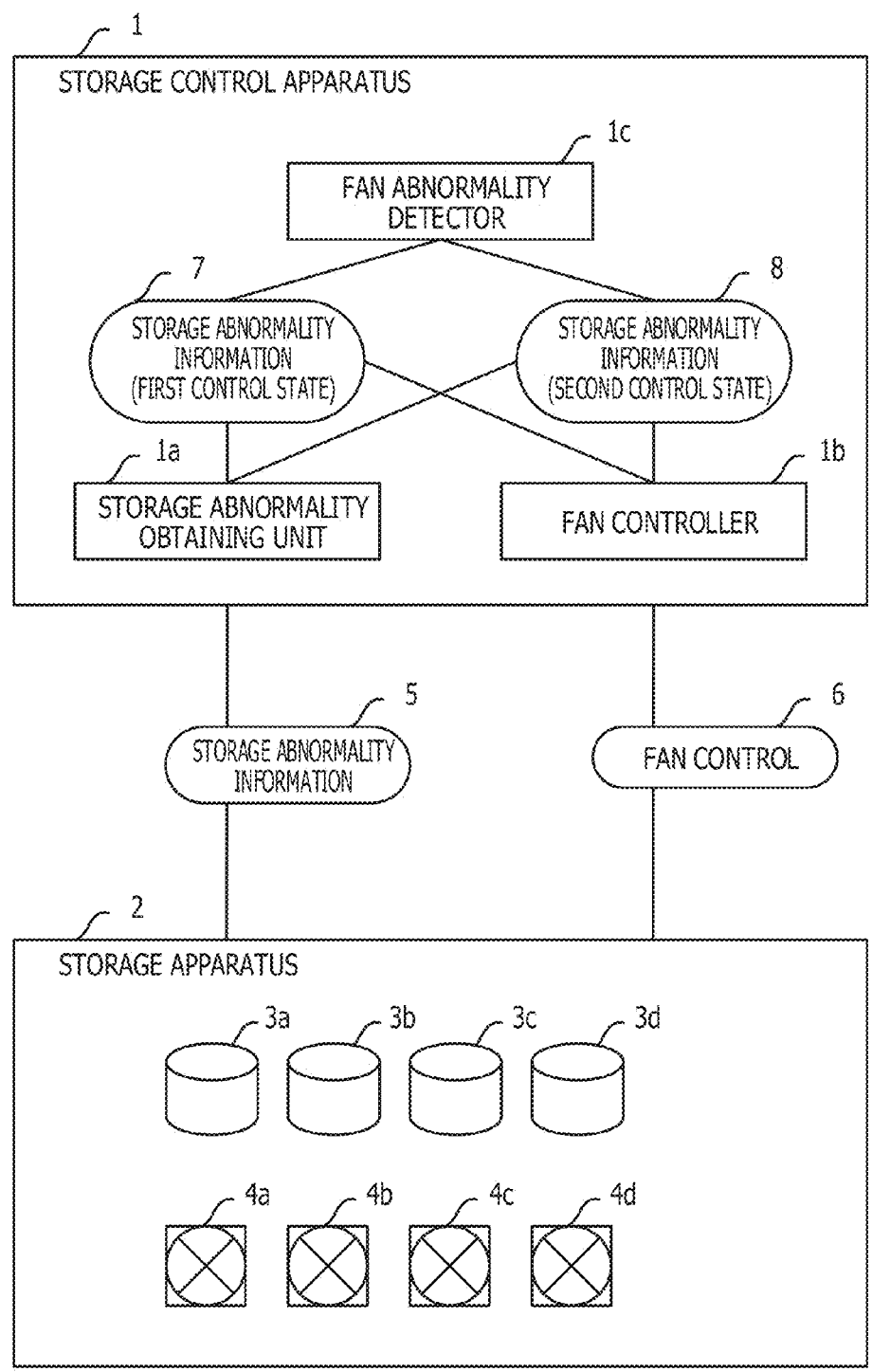
FIG. 1 is a diagram illustrating an exemplary configuration of a storage control apparatus according to a first embodiment.

First, a storage apparatus according to a first embodiment will be described with reference to FIG. 1. FIG. 1 is a diagram illustrating an exemplary configuration of a storage control apparatus according to the first embodiment.

The storage control apparatus 1 controls a storage apparatus 2. The storage apparatus 2 includes in a casing thereof a plurality of storage units 3 (3a, 3b, 3c, and 3d) and a plurality of cooling fans 4 (4a, 4b, 4c, and 4d) that cool the storage units 3. Specifically, the storage control apparatus 1 controls the storage units 3 of the storage apparatus 2 and the cooling fans 4 of the storage apparatus 2. The storage control apparatus 1 does not have to be provided separately from the storage apparatus 2 and may instead be provided so as to be integrated with the storage apparatus 2.

The storage units 3 are storage units that contain mechanical elements and are for example disk media such as hard disk drives (HDDs). In the case of HDDs, the mechanical elements include a read/write (R/W) head driving mechanism, a spindle rotating mechanism and so forth.

Errors may occur in the storage units 3. One cause of such errors is extraneous vibrations. Errors may be detected as abnormalities in access in the storage units 3 and, for example, these include read errors, write errors, and off-track errors, that is, failing in tracking on the disk medium. Since errors in the storage units 3 cause the access performance of the storage units 3 to be decreased, it is preferable for the storage apparatus 2 to suppress extraneous vibrations that cause such errors. FIG. 1 illustrates a case in which the storage apparatus 2 includes four storage units 3, but the storage apparatus 2 may include an arbitrary number of storage units 3.

The cooling fans 4 generate an air current inside the casing to assist with the intake and exhaust of air into and from the casing of the storage apparatus 2 or with the exhaust of heat from the storage apparatus 2. FIG. 1 illustrates a case in which the storage apparatus 2 includes four cooling fans 4, but it is sufficient that the storage apparatus 2 includes two or more cooling fans 4 for the sake of redundancy.

The storage control apparatus 1 includes a storage abnormality obtaining unit 1a, a fan controller 1b, and a fan abnormality detector 1c. The storage abnormality obtaining unit 1a obtains storage abnormality information 5 regarding abnormalities in access to each of the plurality of storage units 3. The storage abnormality information 5 for example includes information regarding an error in writing data into a storage unit 3 and an error in reading data from a storage unit 3.

The fan controller 1b performs control in order to switch a control state determined by a combination of operation modes of the plurality of cooling fans 4 between a first control state and a second control state that is different from the first control state. The first control state and the second control state are control states that are determined by the combination of operation modes of the plurality of cooling fans 4. The second control state is a control state in which the capability to cool the storage apparatus 2 is lower than that in the first control state.

The operation modes (for example, normal operating mode, stop mode, and low-speed operating mode) of the cooling fans 4 may be individually changed through fan control 6. For example, an alternating current (AC) motor is a driving source of each cooling fan 4 and the operation mode of each cooling fan 4 may be changed via pulse width modulation (fan control 6).

The first control state and the second control state are control states with different combinations of operation modes of the plurality of cooling fans 4. For example, the first control state is a control state in which all of the cooling fans 4a, 4b, 4c, and 4d are made to be in the normal operating mode, and the second control state is a control state in which the cooling fans 4a, 4b, and 4c are made to be in the normal operating mode and the cooling fan 4d is made to be in the stop mode.

The fan abnormality detector is detects at least one cooling fan 4 among the plurality of cooling fans 4, which is related to an abnormality in a storage unit 3, on the basis of storage abnormality information 7 for the first control state and storage abnormality information 8 for the second control state. The storage abnormality information 7 is for example an error frequency of the storage unit 3 in the first control state and the storage abnormality information 8 is for example an error frequency of the storage unit 3 in the second control state. In the case where there is a discrepancy between the storage abnormality information 7 and the storage abnormality information 8, the fan abnormality detector is infers that the difference between the combination of the operation modes of the cooling fans 4 in the first control state and the combination of the operation modes of the cooling fans 4 in the second control state is the cause of this discrepancy. Thus, the fan abnormality detector 1c is able to detect a cooling fan 4 that has a different operation mode in the first control state and the second control state among the plurality of cooling fans 4 as a cooling fan 4 related to the abnormality in the storage unit 3.

In this way, the storage control apparatus 1 is able to detect a cooling fan 4 that is causing the access performance of the storage apparatus 2 to be reduced.

Second Embodiment

Figure 2:
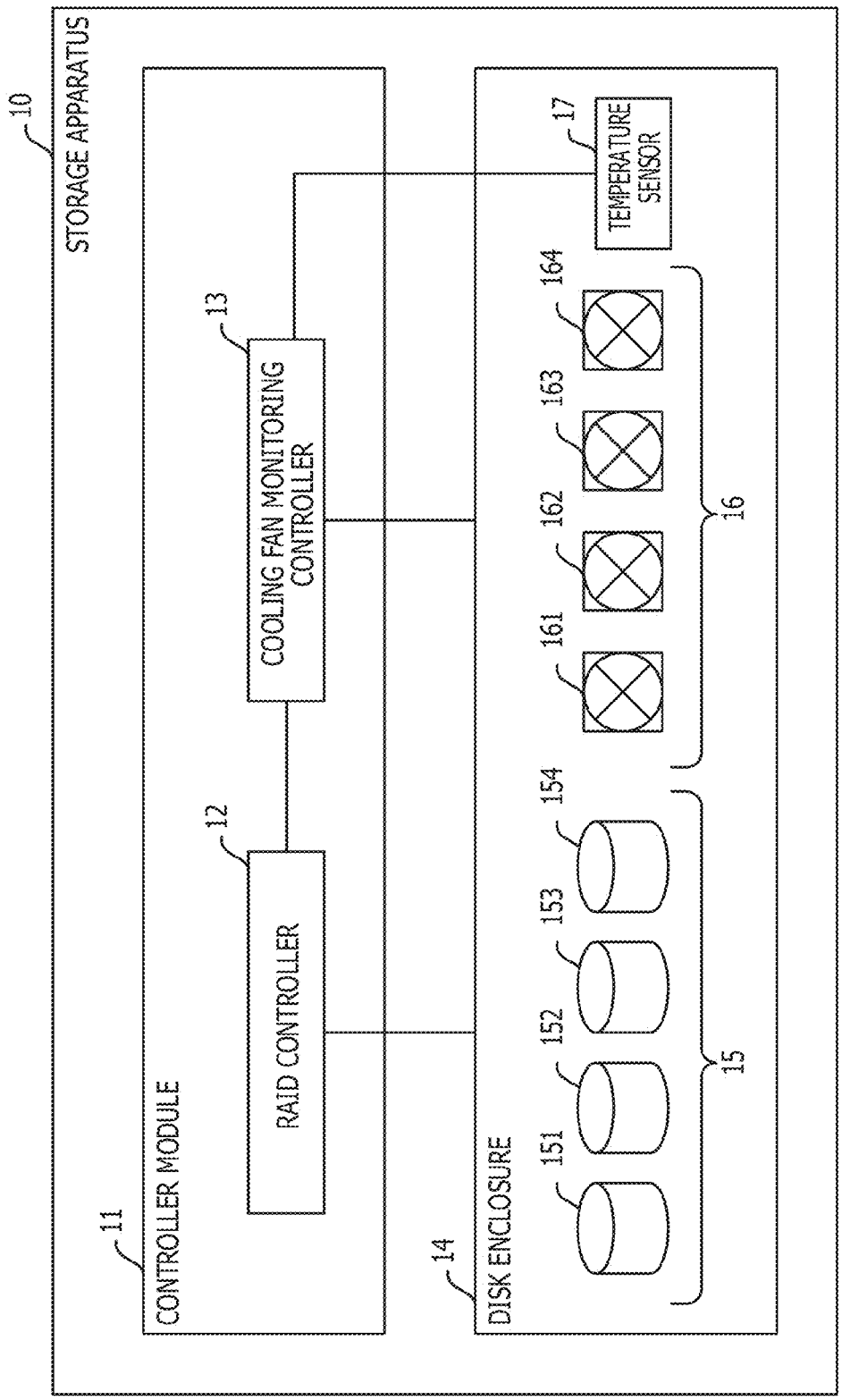
FIG. 2 is a diagram illustrating an exemplary configuration of a storage apparatus according to a second embodiment.

Next, a configuration of a storage apparatus according to a second embodiment will be described with reference to FIG. 2. FIG. 2 is a diagram illustrating an exemplary configuration of the storage apparatus according to the second embodiment.

A storage apparatus 10 has a large capacity storage area. The storage apparatus 10 includes a controller module 11 and a disk enclosure 14. In the storage apparatus 10, the controller module 11 and the disk enclosure 14 are housed in a single housing casing. However, in the storage apparatus 10, the controller module 11 and the disk enclosure 14 may be instead housed in individual housing casings.

The controller module 11 includes a RAID controller 12 and a cooling fan monitoring controller 13. The disk enclosure 14 includes a plurality of disks (storage units) 15 (151, 152, 153, and 154) and a plurality of cooling fans 16 (161, 162, 163, and 164). Although FIG. 2 illustrates disks 151, 152, 153, and 154, the number of disks 15 included in the disk enclosure 14 is not limited to four and may be any number of disks. In addition, although FIG. 2 illustrates the cooling fans 161, 162, 163, and 164, the number of cooling fans 16 included in the disk enclosure 14 is not limited to four and may be any number so long as it is two or more.

The disks 15 are storage units that include mechanical elements and for example are hard disks. The cooling fans 16 assist with exhaust of heat from the housing casing by inhaling and exhausting air into and from the housing casing in which the disks 15 are housed or by generating an air current inside the housing casing. The cooling fans 16 are driven by motors whose rotational speed may be controlled. The operation mode of each of the plurality of cooling fans 16 may be changed in accordance with an instruction from the outside and the rotational speeds of the cooling fans 16 while they are operating may be detected and notified to the outside.

The RAID controller 12 configures a RAID formed of the plurality of disks 15 and performs read/write control on the disks 15 in response to input/output (I/O) requests from an external apparatus (not illustrated). In addition, the RAID controller 12 is capable of accumulating state information including error information from the plurality of disks 15.

The RAID controller 12 is capable of accumulating the error information by notifications from the disks 15 or inquiries to the disks 15.

The cooling fan monitoring controller 13 obtains temperature information from a temperature sensor 17 that detects a temperature of the housing casing in which the disks 15 are housed. The cooling fan monitoring controller 13 operates the cooling fans 16 on the basis of the obtained temperature information and suitably maintains the operation environment of the disks 15.

The cooling fan monitoring controller 13 instructs each of the cooling fans 16 on the operation mode and monitors the operation mode of each of the cooling fans 16 by accumulating the rotational speeds thereof. In addition, the cooling fan monitoring controller 13 accumulates error information regarding the plurality of disks 15 via the RAID controller 12. The cooling fan monitoring controller 13 detects a cooling fan 16 that is the cause of an error in a disk 15 on the basis of the operation modes of the cooling fans 16 and error states of the plurality of disks 15.

The storage apparatus 10 illustrated in FIG. 2 includes one controller module 11 and one disk enclosure 14, but may instead include one controller module 11 and two or more disk enclosures 14.

Figure 3:
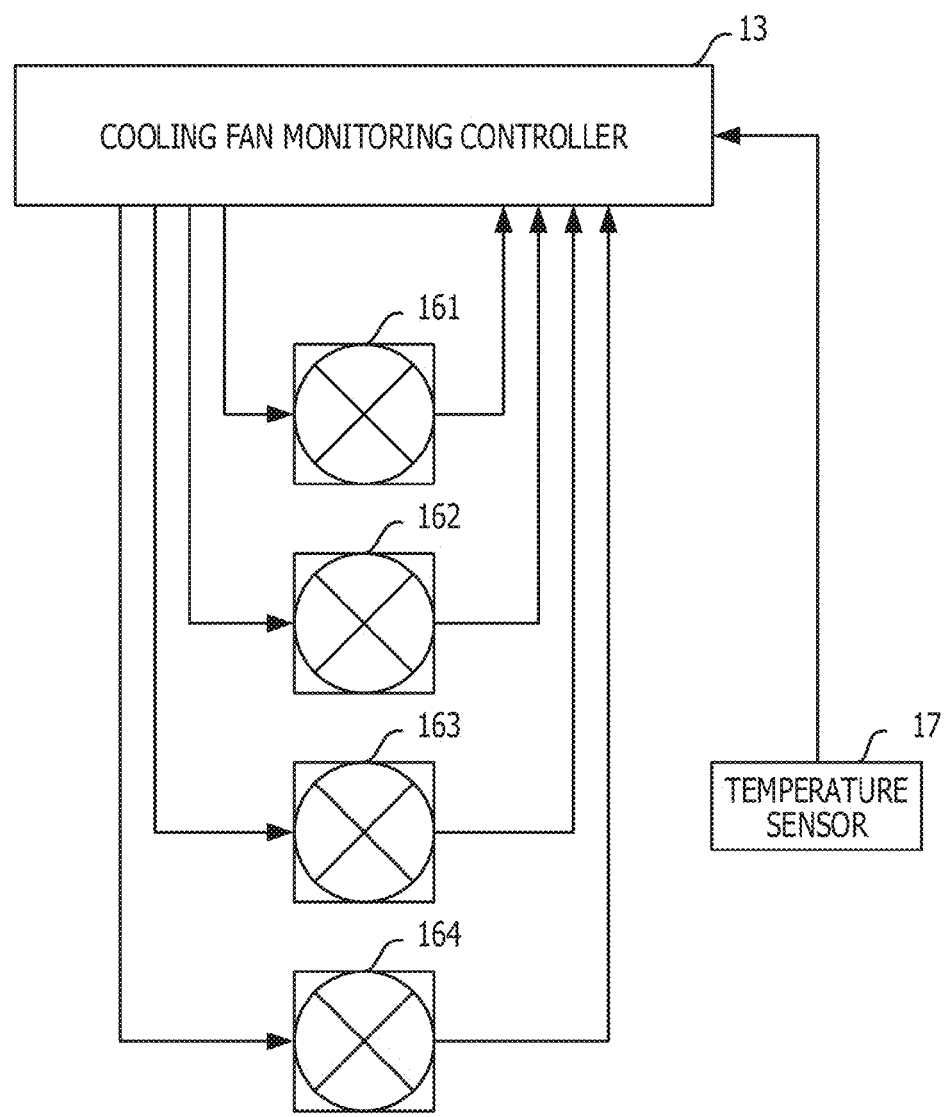
FIG. 3 is a diagram illustrating an example of a cooling fan monitoring controller and cooling fans according to a second embodiment.

Next, the cooling fan monitoring controller and the cooling fans will be described with reference to FIG. 3. FIG. 3 is a diagram illustrating an example of a cooling fan monitoring controller and cooling fans according to the second embodiment. The cooling fan monitoring controller 13 controls operation modes of the cooling fans 161, 162, 163, and 164 by using voltage signals (rotational speed instructions) that provide instructions using an alternating current pulse width modulation method. In the cooling fans 161, 162, 163, and 164, fans are driven with AC motors, which are driven by applying an alternating current, so as to generate an air current. The cooling fans 161, 162, 163, and 164 each include a sensor (not illustrated) that detects the rotational speed of the corresponding AC motor, and output the detected rotational speed in the form of pulses as a voltage signal. The cooling fan monitoring controller 13 is able to detect the rotational speeds (operation modes) by counting the pulses (rotational speed outputs) output by the cooling fans 161, 162, 163, and 164.

The cooling fan monitoring controller 13 is able to detect abnormalities in the cooling fans 161, 162, 163, and 164 by determining whether the operation modes of the cooling fans 161, 162, 163, and 164 match the instructed operation modes. Such abnormality detection suitably detects malfunctions in the cooling fans 161, 162, 163, and 164.

Figure 4:
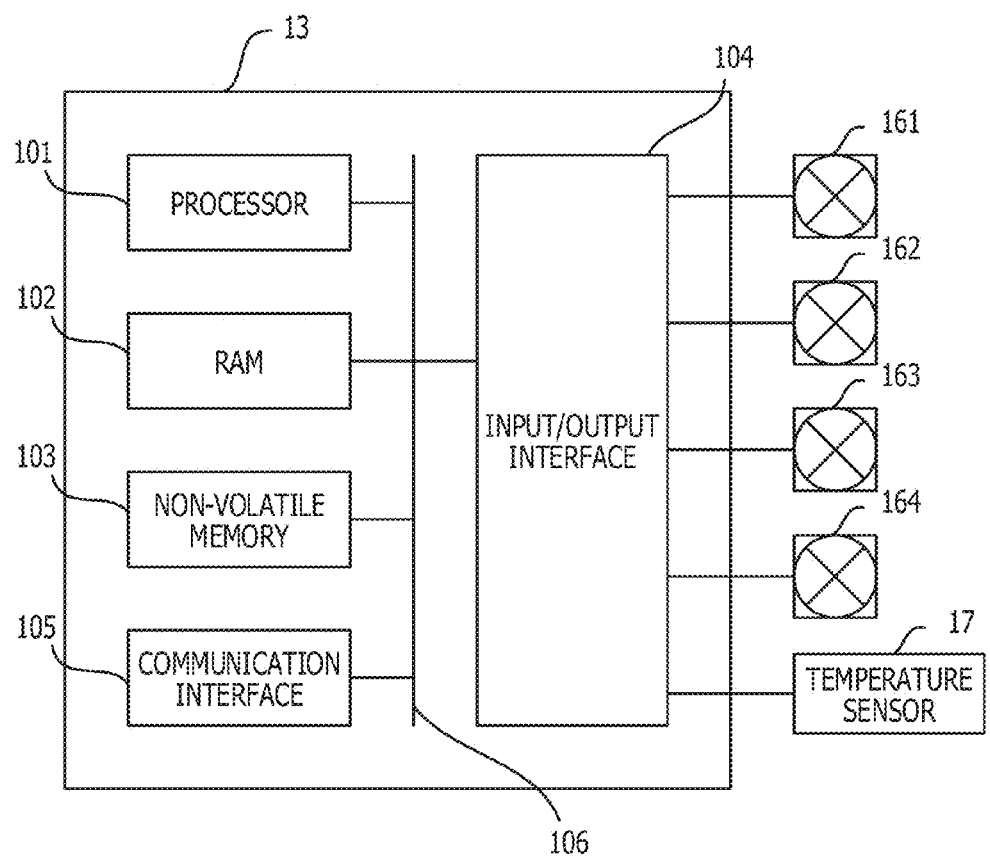
FIG. 4 is a diagram illustrating an exemplary hardware configuration of a cooling fan monitoring controller according to a second embodiment.

Next, the hardware configuration of the cooling fan monitoring controller 13 will be described with reference to FIG. 4. FIG. 4 is a diagram illustrating an exemplary hardware configuration of the cooling fan monitoring controller according to the second embodiment.

The entirety of the cooling fan monitoring controller 13 is controlled by a processor 101. A random access memory (RAM) 102 and a plurality of peripheral components are connected to the processor 101 via a bus 106. The processor 101 may be formed of multiple processors. The processor 101 is for example a central processing unit (CPU), a micro processing unit (MPU), a digital signal processor (DSP), an application specific integrated circuit (ASIC), or a programmable logic device (PLD). The processor 101 may be a combination of any two or more of a CPU, an MPU, a DSP, an ASIC, and a PLD.

The RAM 102 is used as a main storage unit of the cooling fan monitoring controller 13. Operating system programs, firmware, and application programs to be executed by the processor 101 may be at least partly stored temporarily in the RAM 102. In addition, various types of data (for example, information managed for system control) that is used in processing performed by the processor 101 is stored in the RAM 102. The RAM 102 may include a cache memory that is separate from the memory used to store the various types of data.

The peripheral components connected to the bus 106 include a non-volatile memory 103, an input/output interface 104, and a communication interface 105. The non-volatile memory 103 holds stored contents even when the power supply of the cooling fan monitoring controller 13 is shut off. The non-volatile memory 103 is for example a semiconductor storage unit such as an electrically erasable and programmable read-only memory (EEPROM) or a flash memory, or an HDD. The non-volatile memory 103 is used as an auxiliary storage unit of the cooling fan monitoring controller 13. Operating system programs, firmware, application programs, and various types of data are stored in the non-volatile memory 103.

The input/output interface 104 is connected to the cooling fans 161, 162, 163, and 164, the temperature sensor 17, and input/output devices (not illustrated), and performs input and output therewith. The communication interface 105 is connected to the RAID controller 12 and transmits data thereto and receives data therefrom. In addition, the communication interface 105 is connected to external apparatuses via a network (not illustrated) and transmits data thereto and receives data therefrom.

With the above-described hardware configuration, processing functions of the cooling fan monitoring controller 13 according to the second embodiment may be realized. In addition to the cooling fan monitoring controller 13, the RAID controller 12 and the storage control apparatus 1 described in the first embodiment may also be realized using similar hardware to that of the cooling fan monitoring controller 13.

The cooling fan monitoring controller 13 realizes processing functions according to the second embodiment by for example executing a program stored in a computer-readable recording medium. The program in which the processing contents to be executed by the cooling fan monitoring controller 13 are described may be recorded on any of a variety of recording media. For example, the program to be executed by the cooling fan monitoring controller 13 may be stored in the non-volatile memory 103. The processor 101 may load at least part of the program stored in the non-volatile memory 103 into the RAM 102 and execute the program. In addition, the program to be executed by the cooling fan monitoring controller 13 may be recorded on a portable recording medium (not illustrated) such as an optical disc, a memory unit, or a memory card. Examples of an optical disc include a digital versatile disc (DVD), a DVD-RAM, a compact disc read-only memory (CD-ROM), or a CD-recordable(R)/rewritable(RW). A memory unit is a recording medium having a function of communicating with the input/output interface 104 or a device connection interface (not illustrated). For example, the memory unit may write data into a memory card and read data from a memory card using a memory card reader/writer. A memory card is a card-type recording medium.

The program stored in the portable recording medium for example may be executed after being installed in the non-volatile memory 103 under the control of the processor 101. The processor 101 may directly read the program from the portable recording medium and then execute it.

Figure 5:
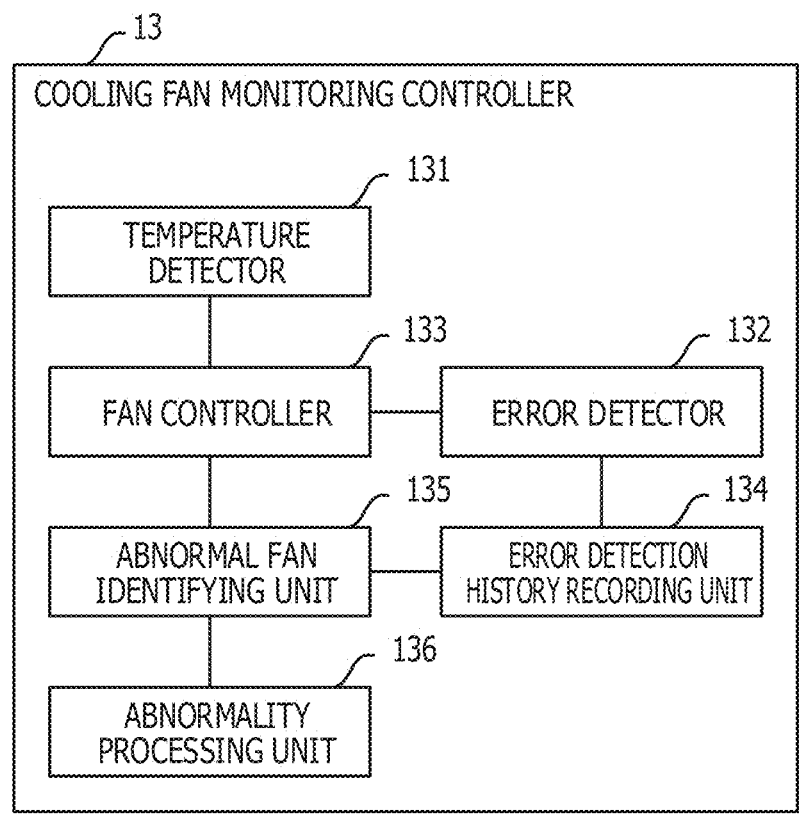
FIG. 5 is a diagram illustrating an exemplary functional configuration of a cooling fan monitoring controller according to a second embodiment.

Next, the functional configuration of the cooling fan monitoring controller 13 will be described with reference to FIG. 5. FIG. 5 is a diagram illustrating an exemplary functional configuration of the cooling fan monitoring controller according to the second embodiment. The cooling fan monitoring controller 13 includes a temperature detector 131, an error detector 132, a fan controller 133, an error detection history recording unit 134, an abnormal fan identifying unit 135, and an abnormality processing unit 136. The temperature detector 131 detects a temperature of a housing casing that houses the disks 15. The fan controller 133 controls operation of the cooling fans 16 on the basis of the temperature of the housing casing that houses the disks 15. In addition, the fan controller 133 controls operation of the cooling fans 16 in order to detect a cooling fan 16 that is a source of extraneous vibrations.

The error detector 132 detects errors (for example, an off-track error) in the disks 15. The error detection history recording unit 134 records an error detection history (storage abnormality information obtainment history) regarding the disks 15. The record of the error detection history includes a correspondence relationship between the errors and the operation modes of the cooling fans 16 at the times when the errors are detected.

The abnormal fan identifying unit 135 identifies, as an abnormal fan, a cooling fan 16 that is the cause of an error on the basis of the error detection history, specifically, the errors and the corresponding operation modes of the cooling fans 16 included in the error detection history. The abnormality processing unit 136 reports the abnormal fan. In addition, the abnormality processing unit 136 changes the operation mode of a cooling fan 16 that has been identified as an abnormal fan.

Figure 6:
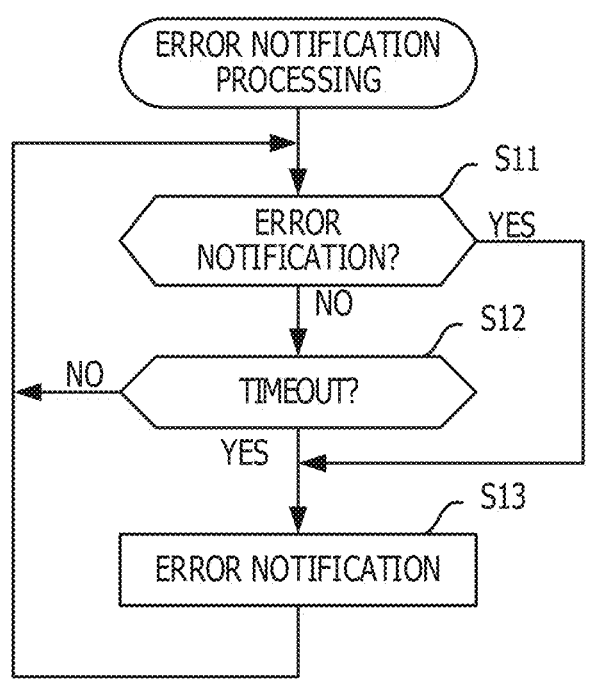
FIG. 6 is a diagram illustrating a flowchart of error notification processing according to a second embodiment.

Next, error notification processing according to the second embodiment will be described with reference to FIG. 6. FIG. 6 is a diagram illustrating a flowchart of error notification processing according to the second embodiment. The error notification processing is processing executed by the RAID controller 12 during RAID control.

(S11) The RAID controller 12 determines whether there is an error notification from a disk 15. The RAID controller 12 advances the processing to S12 in the case where it is determined that there is no error notification from a disk 15, and advances the processing to S13 in the case where it is determined that there is an error notification from a disk 15.

(S12) When the RAID controller 12 makes a request (for example I/O request) to the disk 15 and does not receive a response to the request within a certain period of time, the RAID controller 12 detects a timeout error. The RAID controller 12 determines the presence/absence of detection of a timeout error for a disk 15. The RAID controller 12 advances the processing to S11 in the case where it is determined that no timeout error is detected for a disk 15, and advances the processing to S13 in the case where it is determined that a timeout error is detected for a disk 15.

(S13) The RAID controller 12 notifies the cooling fan monitoring controller 13 of the error notified from the disk 15 or of the timeout error detected by the RAID controller 12.

Figure 7:
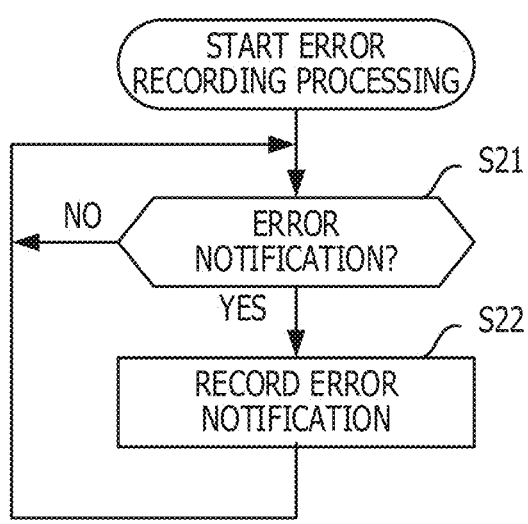
FIG. 7 is a diagram illustrating a flowchart of error recording processing according to a second embodiment.

Next, error recording processing according to the second embodiment will be described with reference to FIG. 7. FIG. 7 is a diagram illustrating a flowchart of error recording processing according to the second embodiment. The error recording processing is processing that is executed by the cooling fan monitoring controller 13 during operation of the storage apparatus 10.

(S21) The cooling fan monitoring controller 13 (error detector 132) determines whether the cooling fan monitoring controller 13 has received, from the RAID controller 12, notification of an error notified by a disk 15 or a timeout error detected by the RAID controller 12. The cooling fan monitoring controller 13 advances the processing to S22 in the case where it is determined that there is an error notification, and waits for an error notification in the case where it is determined that there is no error notification.

(S22) The cooling fan monitoring controller 13 (error detection history recording unit 134) records the notified error in the error detection history. The cooling fan monitoring controller 13 records the operation mode of the cooling fan 16 along with the error. It is sufficient that it be possible to identify a correspondence relationship between the notified error and the operation mode of the cooling fan 16 at the time of detection of the error, and the operation mode of the cooling fan 16 does not necessarily have to be recorded in the error detection history. The error detection history may include for example an error type, identification information of the disk 15, and an installation position of the disk 15 (for example, slot number).

Figure 8:
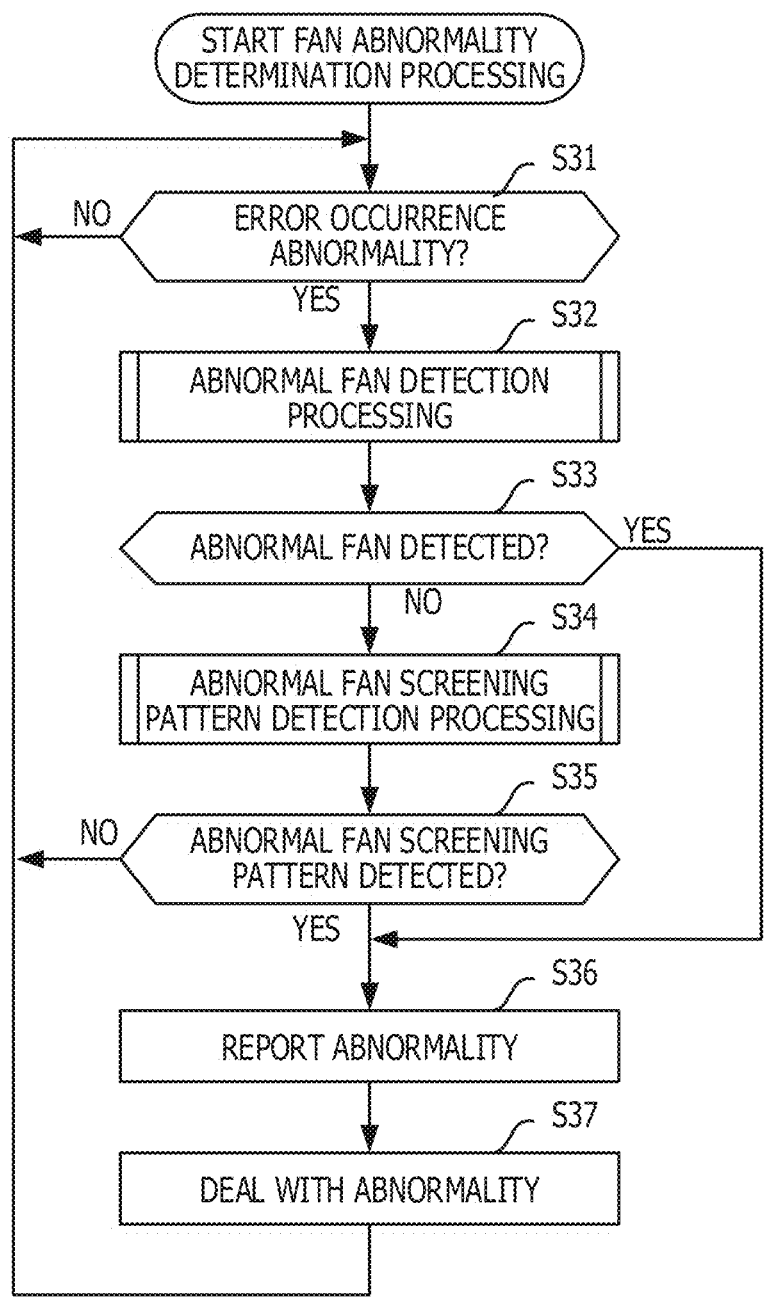
FIG. 8 is a diagram illustrating a flowchart of fan abnormality determination processing according to a second embodiment.

Thus, the cooling fan monitoring controller 13 is able to detect an error in a disk 15 and record error detection history. Next, fan abnormality determination processing according to the second embodiment will be described with reference to FIG. 8. FIG. 8 is a diagram illustrating a flowchart of fan abnormality determination processing according to the second embodiment. The fan abnormality determination processing is processing that the cooling fan monitoring controller 13 executes during operation of the storage apparatus 10.

(S31) The cooling fan monitoring controller 13 (abnormal fan identifying unit 135) determines the presence/absence of an error occurrence abnormality within a certain monitoring period on the basis of the error detection history recorded in the error detection history recording unit 134. For example, the cooling fan monitoring controller 13 determines the presence/absence of an error occurrence abnormality on the basis of whether the frequency of occurrence of an off-track error of the disk 15 within the past 10 minutes has exceeded a certain threshold. The cooling fan monitoring controller 13 advances the processing to S32 in the case where it is determined that there is an error occurrence abnormality, and waits for an error occurrence abnormality in the case where it is determined that there is no error occurrence abnormality.

(S32) The cooling fan monitoring controller 13 (abnormal fan identifying unit 135) executes abnormal fan detection processing. The abnormal fan detection processing is processing for detecting a cooling fan 16 (abnormal fan) that is the cause of an off-track error in the disk 15. Details of the abnormal fan detection processing will be described later with reference to FIG. 9.

(S33) The cooling fan monitoring controller 13 (abnormal fan identifying unit 135) determines whether an abnormal fan has been detected. The cooling fan monitoring controller 13 advances the processing to S36 in the case where it is determined that an abnormal fan has been detected, and advances the processing to S34 in the case where it is determined that no abnormal fan has been detected.

(S34) The cooling fan monitoring controller 13 (abnormal fan identifying unit 135) executes abnormal fan screening pattern detection processing. The abnormal fan screening pattern detection processing is processing for detecting an operation pattern (abnormal fan screening pattern) of the cooling fans 16, for screening the cooling fans 16 that cause an off-track error in the disk 15. An abnormal fan screening pattern is a specific combination of operation modes among combinations of operation modes of the plurality of cooling fans 16, which improves (decreases) the frequency of occurrence of errors. Details of the abnormal fan screening pattern detection processing will be described later with reference to FIG. 10.

(S35) The cooling fan monitoring controller 13 (abnormal fan identifying unit 135) determines whether an abnormal fan screening pattern has been detected. The cooling fan monitoring controller 13 advances the processing to S36 in the case where it is determined that an abnormal fan screening pattern has been detected, and advances the processing to S31 in the case where it is determined that no abnormal fan screening pattern has been detected.

(S36) The cooling fan monitoring controller 13 (abnormality processing unit 136) reports the detected abnormal fan or abnormal fans identified based on the detected abnormal fan screening pattern in a preset manner. For example, the cooling fan monitoring controller 13 may output and display report contents using a display unit (not illustrated). The cooling fan monitoring controller 13 may transmit report contents to an external apparatus (not illustrated).

(S37) The cooling fan monitoring controller 13 (abnormality processing unit 136) deals with the detected abnormality. Specifically, the cooling fan monitoring controller 13 changes the operation mode of the detected abnormal fan or excludes the abnormal operation pattern (a combination of operation modes of the cooling fans 16 when it is determined that there is an error occurrence abnormality in S31). For example, the cooling fan monitoring controller 13 stops the detected abnormal fan or changes the operation mode of the detected abnormal fan to the low-speed operating mode from the normal operating mode. The cooling fan monitoring controller 13 advances the processing to S31 after dealing with the detected abnormality.

Thus, the cooling fan monitoring controller 13 is able to identify and remove the cause of the off-track error. Therefore, the storage apparatus 10 is able to detect the cooling fan 16 that is causing the access performance of the disk 15 in the storage apparatus 10 to be decreased.

Determination of the presence/absence of an error occurrence abnormality within the certain monitoring period in S31 is performed to decide the timing when the abnormal fan detection processing and the abnormal fan screening pattern detection processing will be executed. Instead of determining the presence/absence of an error occurrence abnormality within the certain monitoring period, the cooling fan monitoring controller 13 may make a certain set timing or a timing at which a certain operation period elapses be the timing at which to execute the abnormal fan detection processing and the abnormal fan screening pattern detection processing.

Figure 9:
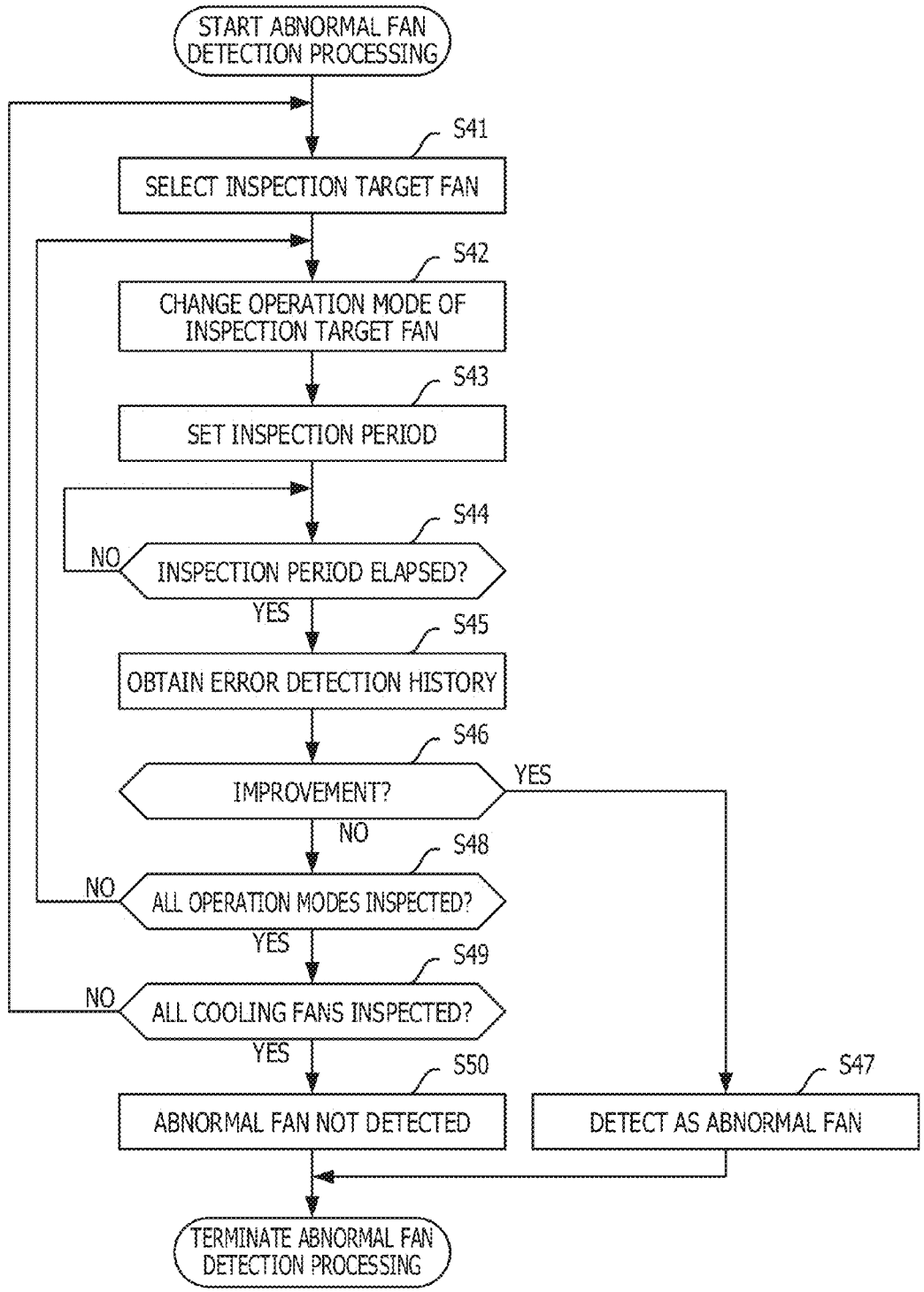
FIG. 9 is a diagram illustrating a flowchart of abnormal fan detection processing according to a second embodiment.

Next, abnormal fan detection processing according to the second embodiment will be described with reference to FIG. 9. FIG. 9 is a diagram illustrating a flowchart of abnormal fan detection processing according to the second embodiment. The abnormal fan detection processing is processing that is executed by the cooling fan monitoring controller 13 (abnormal fan identifying unit 135) in S32 of the fan abnormality determination processing.

(S41) The cooling fan monitoring controller 13 selects one cooling fan 16 from among the plurality of cooling fans 16 as an inspection target fan.

(S42) The cooling fan monitoring controller 13 changes the operation mode of the inspection target fan. For example, in the case where the operation mode of the inspection target fan is the normal operating mode, the cooling fan monitoring controller 13 changes the operation mode of the inspection target fan to the low-speed operating mode, and in the case where the operation mode of the inspection target fan is the low-speed operating mode, the cooling fan monitoring controller 13 changes the operation mode of the inspection target fan to the stop mode.

(S43) The cooling fan monitoring controller 13 sets an inspection period of time for the inspection target fan. For example, the cooling fan monitoring controller 13 sets 10 minutes as the inspection period.

(S44) The cooling fan monitoring controller 13 determines whether the inspection period set in S43 has elapsed. The cooling fan monitoring controller 13 advances the processing to S45 in the case where it is determined that the inspection period has elapsed, and waits for the inspection period to elapse in the case where it is determined that the inspection period has not elapsed.

(S45) The cooling fan monitoring controller 13 obtains error detection history during the inspection period.

(S46) The cooling fan monitoring controller 13 determines whether the frequency of occurrence of errors during the inspection period has improved (decreased) compared with before the inspection. The cooling fan monitoring controller 13 advances the processing to S47 in the case where it is determined that the frequency of occurrence of errors during the inspection period has improved, and advances the processing to S48 in the case where it is determined that the frequency of occurrence of errors during the inspection period has not improved.

(S47) The cooling fan monitoring controller 13 identifies (detects) the inspection target fan for which the frequency of occurrence of errors during the inspection period has improved due to changing of the operation mode as an abnormal fan and terminates the abnormal fan detection processing.

(S48) The cooling fan monitoring controller 13 determines whether all of the operation modes have been inspected for the inspection target fan. The cooling fan monitoring controller 13 advances the processing to S49 in the case where it is determined that all of the operation modes have been inspected, and advances the processing to S42 in the case where it is determined that some of the operation modes have not yet been inspected. Thus, the cooling fan monitoring controller 13 is capable of inspecting whether any of the operation modes (for example, stop mode, normal operating mode, low-speed operating mode) of an inspection target fan are the cause of an off-track error.

(S49) The cooling fan monitoring controller 13 determines whether all of the cooling fans 16 have been inspected. The cooling fan monitoring controller 13 advances the processing to S50 in the case where it is determined that all of the cooling fans 16 have been inspected, and advances the processing to S41 in the case where it is determined that some of the cooling fans 16 have not yet been inspected. Thus, the cooling fan monitoring controller 13 is capable of inspecting whether any of the cooling fans 16 is the cause of an off-track error.

(S50) The cooling fan monitoring controller 13 determines that none of the cooling fans 16 alone is causing an off-track error, determines that no abnormal fan has been detected since identification of an abnormal fan has failed, and terminates the abnormal fan detection processing.

Thus, the cooling fan monitoring controller 13 is able to identify an abnormal fan in the case where a single cooling fan 16 is causing an off-track error. Therefore, the storage apparatus 10 is able to detect a cooling fan 16 that is causing the access performance of the disk 15 in the storage apparatus 10 to be decreased.

In the case where the frequency of occurrence of errors during the inspection period has improved, the cooling fan monitoring controller 13 discontinues the inspection of the cooling fans 16 in S46, but may instead terminate the abnormal fan detection processing after waiting until all of the cooling fans 16 have been inspected.

Figure 10:
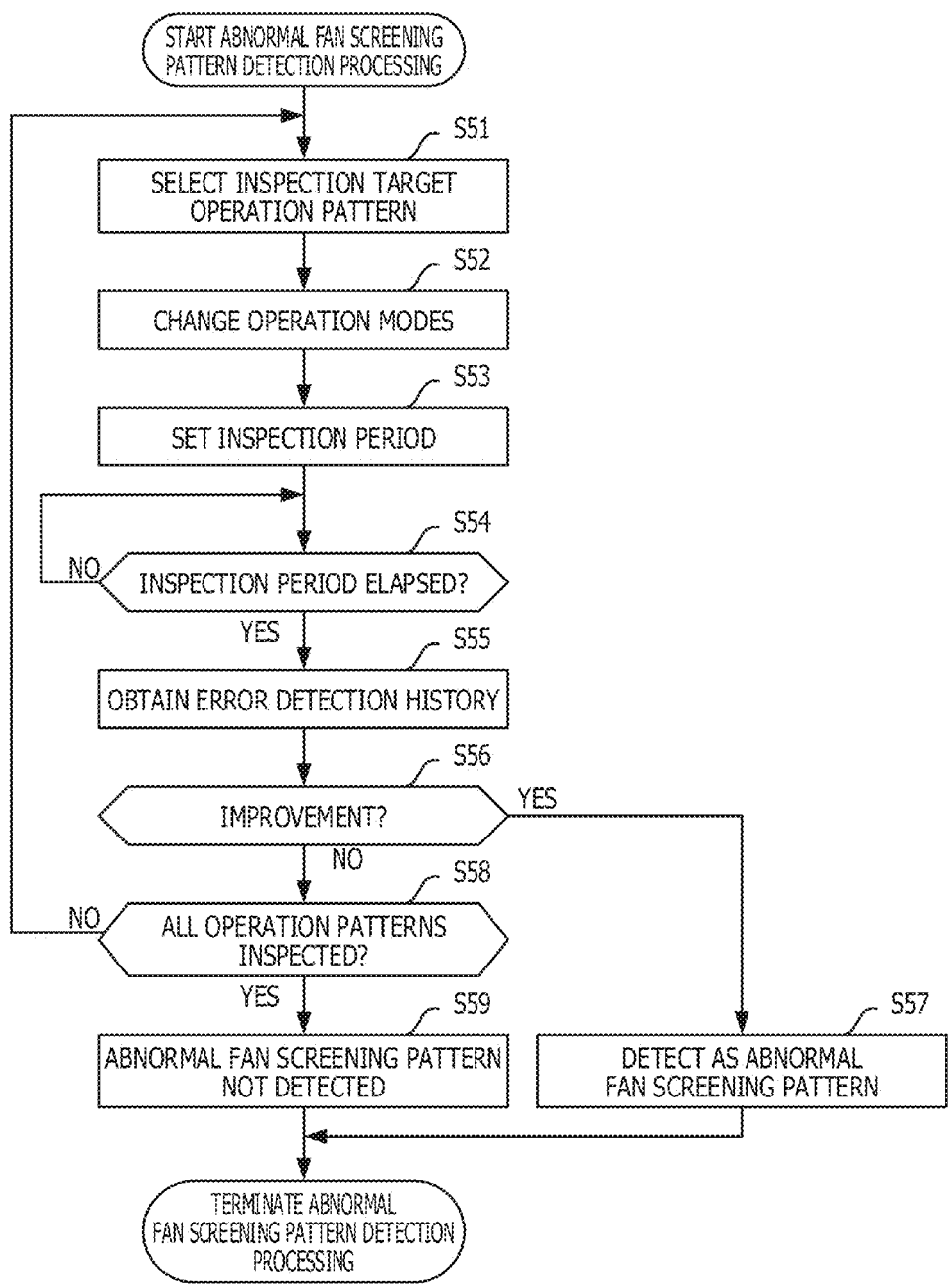
FIG. 10 is a diagram illustrating a flowchart of abnormal fan screening pattern detection processing according to a second embodiment.

Next, abnormal fan screening pattern detection processing according to the second embodiment will be described with reference to FIG. 10. FIG. 10 is a diagram illustrating a flowchart of abnormal fan screening pattern detection processing according to the second embodiment. The abnormal fan screening pattern detection processing is processing that is executed by the cooling fan monitoring controller 13 (abnormal fan identifying unit 135) in S34 of the fan abnormality determination processing.

(S51) The cooling fan monitoring controller 13 selects one operation pattern from among a set of operation patterns of the plurality of cooling fans 16 as an inspection target operation pattern. The set of operation patterns of the plurality of cooling fans 16 may be prepared in advance in the form of an operation pattern table as illustrated in FIG. 11. FIG. 11 is a diagram illustrating an example of an operation pattern table according to the second embodiment. An operation pattern table 50 defines in advance a plurality of operation patterns P1, P2, P3, . . . . The operation patterns define combinations of operation modes of all of the cooling fans (fan A, fan B, fan C, and fan D) corresponding to the cooling fans 16 (161, 162, 163, and 164), respectively. For example, in an operation pattern P1, fan A and fan B are in the low-speed operating mode and fan C and fan D are in the normal operating mode. The operation pattern table may define all possible operation patterns or may only define a limited number of operation patterns. By using such an operation pattern table 50, the cooling fan monitoring controller 13 is able to select an inspection target operation pattern from among the operation patterns defined in the operation pattern table 50.

(S52) The cooling fan monitoring controller 13 changes the operation modes of the cooling fans 16 to the operation modes of the inspection target operation pattern.

(S53) The cooling fan monitoring controller 13 sets an inspection period of time for the inspection target operation pattern. For example, the cooling fan monitoring controller 13 sets 10 minutes as the inspection period.

(S54) The cooling fan monitoring controller 13 determines whether the inspection period set in S53 has elapsed. The cooling fan monitoring controller 13 advances the processing to S55 in the case where it is determined that the inspection period has elapsed, and waits for the inspection period to elapse in the case where it is determined that the inspection period has not yet elapsed.

(S55) The cooling fan monitoring controller 13 obtains error detection history during the inspection period.

(S56) The cooling fan monitoring controller 13 determines whether the frequency of occurrence of errors during the inspection period has improved (decreased) compared with before the inspection. The cooling fan monitoring controller 13 advances the processing to S57 in the case where it is determined that the frequency of occurrence of errors during the inspection period has improved, and advances the processing to S58 in the case where it is determined that the frequency of occurrence of errors during the inspection period has not improved.

(S57) The cooling fan monitoring controller 13 identifies (detects) the inspection target operation pattern for which the frequency of occurrence of errors during the inspection period has improved due to changing of the operation modes as an abnormal fan screening pattern and terminates the abnormal fan screening pattern detection processing.

(S58) The cooling fan monitoring controller 13 determines whether all of the inspection target operation patterns have been inspected. The cooling fan monitoring controller 13 advances the processing to S59 in the case where it is determined that all of the inspection target operation patterns have been inspected, and advances the processing to S51 in the case where it is determined that some of the inspection target operation patterns have not yet been inspected. Thus, the cooling fan monitoring controller 13 is capable of inspecting whether any of the combinations of operation modes (for example, stop mode, normal operating mode, low-speed operating mode) of the cooling fans 16 are causing an off-track error.

(S59) The cooling fan monitoring controller 13 determines that none of the inspection target operation patterns is causing an off-track error, determines that no abnormal fan screening pattern has been detected since identification of an abnormal fan screening pattern has failed, and terminates the abnormal fan screening pattern detection processing.

Thus, the cooling fan monitoring controller 13 is able to identify abnormal fans in the case where a combination of operation modes of the cooling fans 16 is causing an off-track error. Therefore, the storage apparatus 10 is able to detect cooling fans 16 that are causing the access performance of the disk 15 in the storage apparatus 10 to be decreased.

In the case where the frequency of occurrence of errors during the inspection period has improved, the cooling fan monitoring controller 13 discontinues the inspection of the operation patterns in S56, but may instead terminate the abnormal fan screening pattern detection processing after waiting until all of the operation patterns have been inspected.

Figure 12:
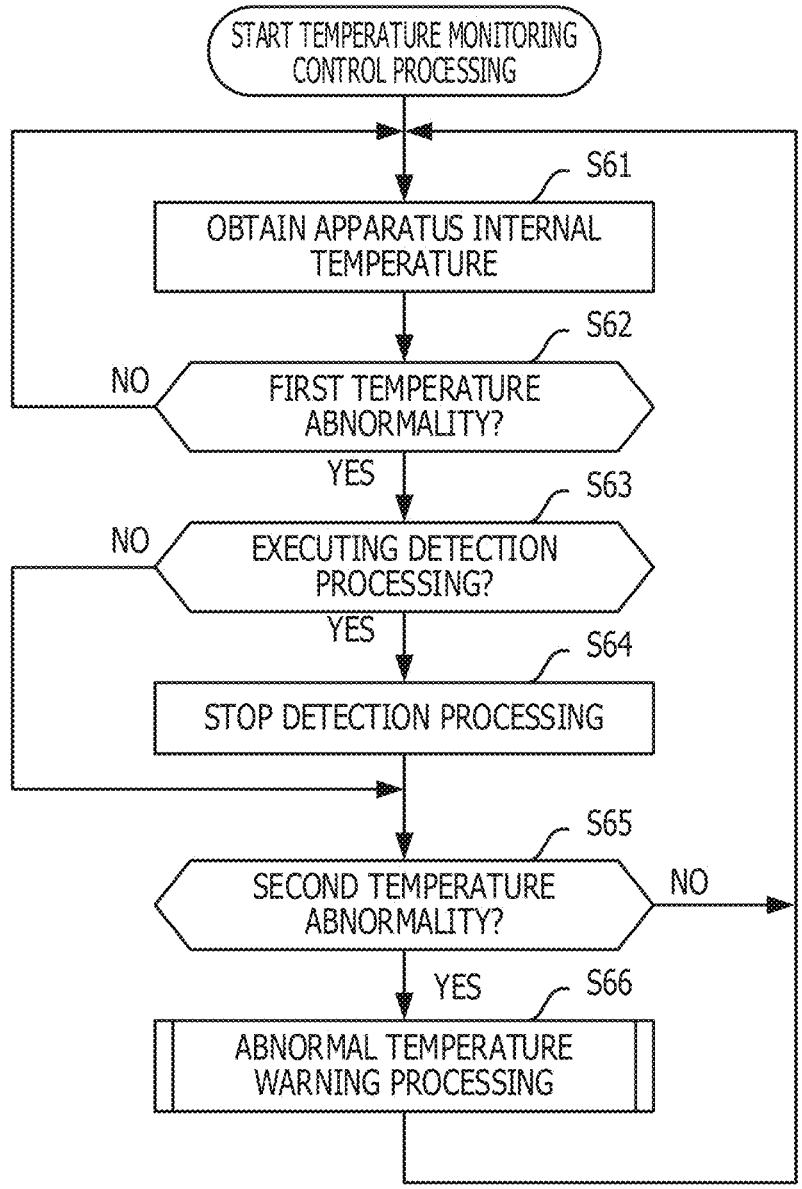
FIG. 12 is a diagram illustrating a flowchart of temperature monitoring control processing according to a second embodiment.

Next, temperature monitoring control processing according to the second embodiment will be described with reference to FIG. 12. FIG. 12 is a diagram illustrating a flowchart of temperature monitoring control processing according to the second embodiment. The temperature monitoring control processing is processing that is executed by the cooling fan monitoring controller 13 during operation of the storage apparatus 10.

(S61) The cooling fan monitoring controller 13 (temperature detector 131) obtains a temperature (apparatus internal temperature) inside the housing casing of the disks 15 of the storage apparatus 10.

(S62) The cooling fan monitoring controller 13 (fan controller 133) determines whether a first temperature abnormality in which the apparatus internal temperature exceeds a preset first threshold temperature has been detected. The cooling fan monitoring controller 13 advances the processing to S63 in the case where it is determined that the first temperature abnormality has been detected, and advances the processing to S61 in the case where it is determined that the first temperature abnormality has not been detected.

(S63) The cooling fan monitoring controller 13 (fan controller 133) determines whether the cooling fan monitoring controller 13 (abnormal fan identifying unit 135) is currently executing the abnormal fan detection processing or the abnormal fan screening pattern detection processing. The cooling fan monitoring controller 13 (fan controller 133) advances the processing to S64 in the case where it is determined that the cooling fan monitoring controller 13 is currently executing the abnormal fan detection processing or the abnormal fan screening pattern detection processing, and advances the processing to S65 in the case where it is determined that the cooling fan monitoring controller 13 is currently executing neither the abnormal fan detection processing nor the abnormal fan screening pattern detection processing.

(S64) The cooling fan monitoring controller 13 (abnormal fan identifying unit 135) stops the abnormal fan detection processing currently being executed or the abnormal fan screening pattern detection processing currently being executed.

(S65) The cooling fan monitoring controller 13 (fan controller 133) determines whether a second temperature abnormality in which the apparatus internal temperature exceeds a preset second threshold temperature has been detected. The second threshold temperature is a temperature that is higher than the first threshold temperature. For example, the second threshold temperature is a temperature at which it is not possible to guarantee normal operations of the storage apparatus 10. The cooling fan monitoring controller 13 advances the processing to S66 in the case where it is determined that the second temperature abnormality has been detected, and advances the processing to S61 in the case where it is determined that the second temperature abnormality has not been detected.

(S66) The cooling fan monitoring controller 13 (fan controller 133) executes abnormal temperature warning processing. The cooling fan monitoring controller 13 advances the processing to S61 after execution of the abnormal temperature warning processing. The cooling fan monitoring controller 13 outputs an alarm (warning) indicating a temperature abnormality in the abnormal temperature warning processing. The abnormal temperature warning processing may include processing for safely stopping the storage apparatus 10 in order to prompt an administrator to identify and inspect the malfunctioning component.

Thus, the storage apparatus 10 is able to identify the cause of an off-track error while safely maintaining the operation environment of the storage apparatus 10. Since the storage apparatus 10 does not simply determine an abnormality of a cooling fan 16 by detecting resonance of a cooling fan 16, excessive identification of malfunctions in the cooling fans 16 and excessive stopping of operation of the cooling fans 16 is avoided. Thus, the storage apparatus 10 is able to reduce the number of occasions upon which redundancy is lost which would cause the cooling performance to be reduced. Since undesirable malfunction identification and stopping of operation of cooling fans 16 is avoided, it is possible to reduce the management cost (for example, acquiring of replacement components, human cost of looking out for abnormalities and so forth) for the cooling fans 16 of the storage apparatus 10.

Even in a case where it is not possible to detect resonance of a cooling fan 16, the storage apparatus 10 is able to identify a cooling fan 16 that is the cause of an off-track error. Thus, the storage apparatus 10 is also able to reduce deterioration of the lifetime of the disks 15 caused by the disks 15 repeatedly experiencing off-track errors. The storage apparatus 10 is also able to reduce management cost (for example, acquiring of replacement components, human cost of looking out for abnormalities and so forth) for the disks 15 of the storage apparatus 10 by reducing deterioration of the lifetime of the disks 15.

Third Embodiment

Next, a third embodiment will be described. The third embodiment differs from the second embodiment, in which abnormal fan detection processing or abnormal fan screening pattern detection processing is executed when there is an error occurrence abnormality, in that changing of the operation pattern is performed even in a normal time. In the description of the third embodiment, points that are different from the second embodiment will be described and description of parts of the configuration that are similar as in the second embodiment will be omitted.

Figure 13:
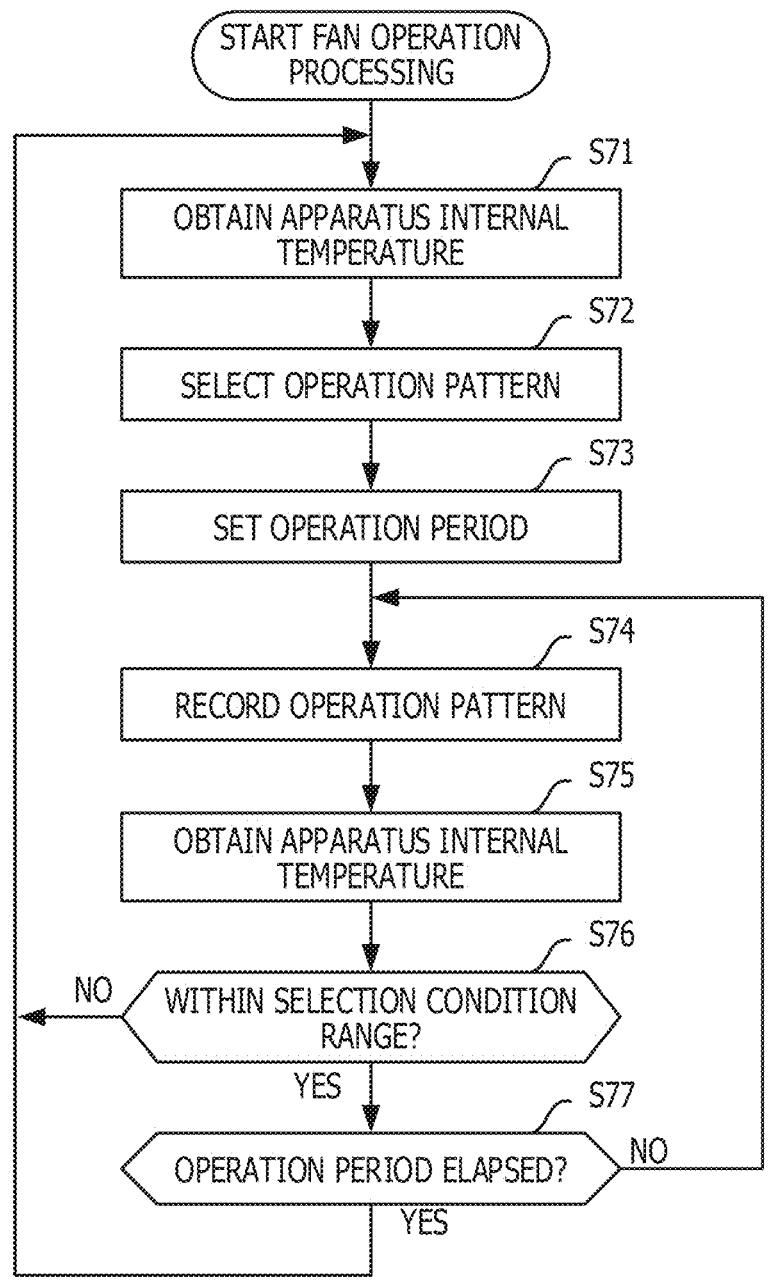
FIG. 13 is a diagram illustrating a flowchart of fan operation processing according to a third embodiment.

First, fan operation processing according to the third embodiment will be described with reference to FIG. 13. FIG. 13 is a diagram illustrating a flowchart of fan operation processing according to the third embodiment. The fan operation processing is processing that is executed by the cooling fan monitoring controller 13 during operation of the storage apparatus 10.

(S71) The cooling fan monitoring controller 13 (temperature detector 131) obtains a temperature (apparatus internal temperature) inside the housing casing of the disks 15 of the storage apparatus 10.

(S72) The cooling fan monitoring controller 13 (fan controller 133) selects an operation pattern of the cooling fans 16 that corresponds to the apparatus internal temperature and updates the operation modes of the cooling fans 16. The set of operation patterns of the plurality of cooling fans 16 may be prepared in advance in the form of an operation pattern table as illustrated in FIG. 14. FIG. 14 is a diagram illustrating an example of an operation pattern table according to the third embodiment. An operation pattern table 51 defines in advance a plurality of operation patterns P01, P02, P03, . . . . The operation patterns define combinations of operation modes of all of the cooling fans (fan A, fan B, fan C, and fan D) corresponding to the cooling fans 16 (161, 162, 163, and 164), respectively. For example, in an operation pattern P02, fan A is in the stop mode, and fan B, fan C, and fan D are in the normal operating mode. In an operation pattern P010, fan A and fan C are in the low-speed operating mode, and fan B and fan D are in the normal operating mode. The operation pattern table may define all possible operation patterns or may only define a limited number of operation patterns. In each operation pattern, in addition to the combination of operation modes of all of the cooling fans 16, an apparatus internal temperature is set for which that operation pattern may be selected. For example, the operation pattern P02 may be selected at an apparatus internal temperature of "T1" or less, and is not allowed to be selected if the apparatus internal temperature exceeds "T1".

By using the operation pattern table 51, the cooling fan monitoring controller 13 may select an operation pattern in accordance with the apparatus internal temperature from among the operation patterns defined in the operation pattern table 51.

(S73) The cooling fan monitoring controller 13 (fan controller 133) sets an operation period of time for the selected operation pattern. For example, the cooling fan monitoring controller 13 sets 60 minutes as the operation period. A period that is longer than the inspection period according to the second embodiment may be adopted as the operation period of the selected operation pattern since the operation is being performed at a normal time.

(S74) The cooling fan monitoring controller 13 (fan controller 133) records the operation pattern of the cooling fans 16 in the operation history (control state switching history).

(S75) The cooling fan monitoring controller 13 (temperature detector 131) obtains a temperature (apparatus internal temperature) inside the housing casing of the disks 15 of the storage apparatus 10.

(S76) The cooling fan monitoring controller 13 (fan controller 133) determines whether the apparatus internal temperature is within a selection condition range for the operation pattern of the cooling fans 16. The cooling fan monitoring controller 13 advances the processing to S77 in the case where it is determined that the apparatus internal temperature is within the selection condition range for the operation pattern of the cooling fans 16, and advances the processing to S71 in the case where it is determined that the apparatus internal temperature is outside of the selection condition range for the operation pattern of the cooling fans 16. That is, the cooling fan monitoring controller 13 suppresses an increase in the apparatus internal temperature of the storage apparatus 10 by re-selecting an operation pattern in accordance with the apparatus internal temperature.

(S77) The cooling fan monitoring controller 13 (fan controller 133) determines whether the operation period set in S73 has elapsed. The cooling fan monitoring controller 13 advances the processing to S71 in the case where it is determined that the operation period has elapsed, and advances the processing to S74 and waits for the operation period to elapse in the case where it is determined that the operation period has not yet elapsed. In other words, the cooling fan monitoring controller 13 accumulates data regarding operations in various operation patterns of the cooling fans 16 in the storage apparatus 10 as a result of re-selecting the operation pattern every time the set operation period elapses.

Regarding the selection of the operation pattern performed in S72, the operation patterns may be sequentially selected or randomly selected from the operation pattern table 51. In addition, the selection of the operation pattern performed in S72 may be scheduled in advance.

Thus, the cooling fan monitoring controller 13 is able to accumulate data regarding operations in various operation patterns of the cooling fans 16 in normal times and therefore an inspection operation in which the cooling performance of the cooling fans 16 is reduced does not have to be performed when an abnormality occurs.

Next, fan abnormality determination processing according to the third embodiment will be described with reference to FIG. 15. FIG. 15 is a diagram illustrating a flowchart of fan abnormality determination processing according to the third embodiment. The fan abnormality determination processing according to the third embodiment is processing that is executed by the cooling fan monitoring controller 13 at certain timing. For example, the certain timing may be timing such as every 24 hours or may be timing when an event such as detection of an increase in the error rate occurs.

(S81) The cooling fan monitoring controller 13 (abnormal fan identifying unit 135) obtains operation history that has been accumulated in the fan operation processing.

(S82) The cooling fan monitoring controller 13 (abnormal fan identifying unit 135) obtains the error detection history that has been accumulated in the error recording processing described in the second embodiment.

(S83) The cooling fan monitoring controller 13 (abnormal fan identifying unit 135) totals the errors for each operation pattern on the basis of the operation history and the error detection history. The cooling fan monitoring controller 13 is able to identify an operation period of time for each operation pattern on the basis of the operation history and identify the number of times an error has occurred for each operation pattern on the basis of the error detection history. The cooling fan monitoring controller 13 is able to calculate the error frequency for each operation pattern on the basis of the operation period for each operation pattern and the number of times an error has occurred for that operation pattern.

The cooling fan monitoring controller 13 (abnormal fan identifying unit 135) may generate an error counting table as illustrated in FIG. 16. FIG. 16 is a diagram illustrating an example of an error counting table according to the third embodiment. An error counting table 52 holds an operation period of time, a number of times an error has occurred, and an error frequency for each operation pattern. For example, for the operation pattern P01, the operation period is OT1, the number of times an error has occurred is ET1, and the error frequency is EF1. The cooling fan monitoring controller 13 is able to evaluate the relationship between an operation pattern and errors by referring to the error counting table 52.

(S84) The cooling fan monitoring controller 13 (abnormal fan identifying unit 135) compares the error frequencies of all of the operation patterns. When comparing the error frequencies, the cooling fan monitoring controller 13 may limit operation patterns that are to be targets of comparison to those for which a certain operation period is exceeded in order to reduce the margin of error.

(S85) The cooling fan monitoring controller 13 (abnormal fan identifying unit 135) determines whether there is an operation pattern (abnormal operation pattern) that generates errors at a high frequency among the operation patterns. For example, the cooling fan monitoring controller 13 evaluates the variation in error frequency among the operation patterns and assumes an error frequency is a high frequency when it does not fall within a preset range. The cooling fan monitoring controller 13 advances the processing to S86 in the case where it is determined that there is an abnormal operation pattern, and terminates the fan abnormality determination processing in the case where it is determined that there is no abnormal operation pattern.

(S86) The cooling fan monitoring controller 13 (abnormality processing unit 136) reports the detected abnormal operation pattern in a preset manner. For example, the cooling fan monitoring controller 13 may output and display report contents using a display unit (not illustrated). The cooling fan monitoring controller 13 may transmit report contents to an external apparatus (not illustrated).

(S87) The cooling fan monitoring controller 13 (abnormality processing unit 136) deals with the detected abnormality. Specifically, the cooling fan monitoring controller 13 excludes the detected abnormal operation pattern. For example, the cooling fan monitoring controller 13 restricts operation in the detected abnormal operation pattern. The cooling fan monitoring controller 13 terminates the fan abnormality determination processing after dealing with the detected abnormality.

Thus, the storage apparatus 10 is able to identify the cause of an off-track error while safely maintaining the operation environment of the storage apparatus 10. In addition, the cooling fan monitoring controller 13 is able to exclude an abnormal operation pattern before detecting specific trouble in the storage apparatus 10.

Since the storage apparatus 10 does not simply determine an abnormality of a cooling fan 16 by detecting resonance of a cooling fan 16, excessive identification of malfunctions in the cooling fans 16 and excessive stopping of operation of the cooling fans 16 is avoided. Thus, the storage apparatus 10 is able to reduce the number of occasions upon which redundancy is lost which would cause the cooling performance to be reduced. Since undesirable malfunction identification and stopping of operation of cooling fans 16 is avoided, it is possible to reduce the management cost (for example, acquiring of replacement components, human cost of looking out for abnormalities and so forth) for the cooling fans 16 of the storage apparatus 10.

Figure 17:
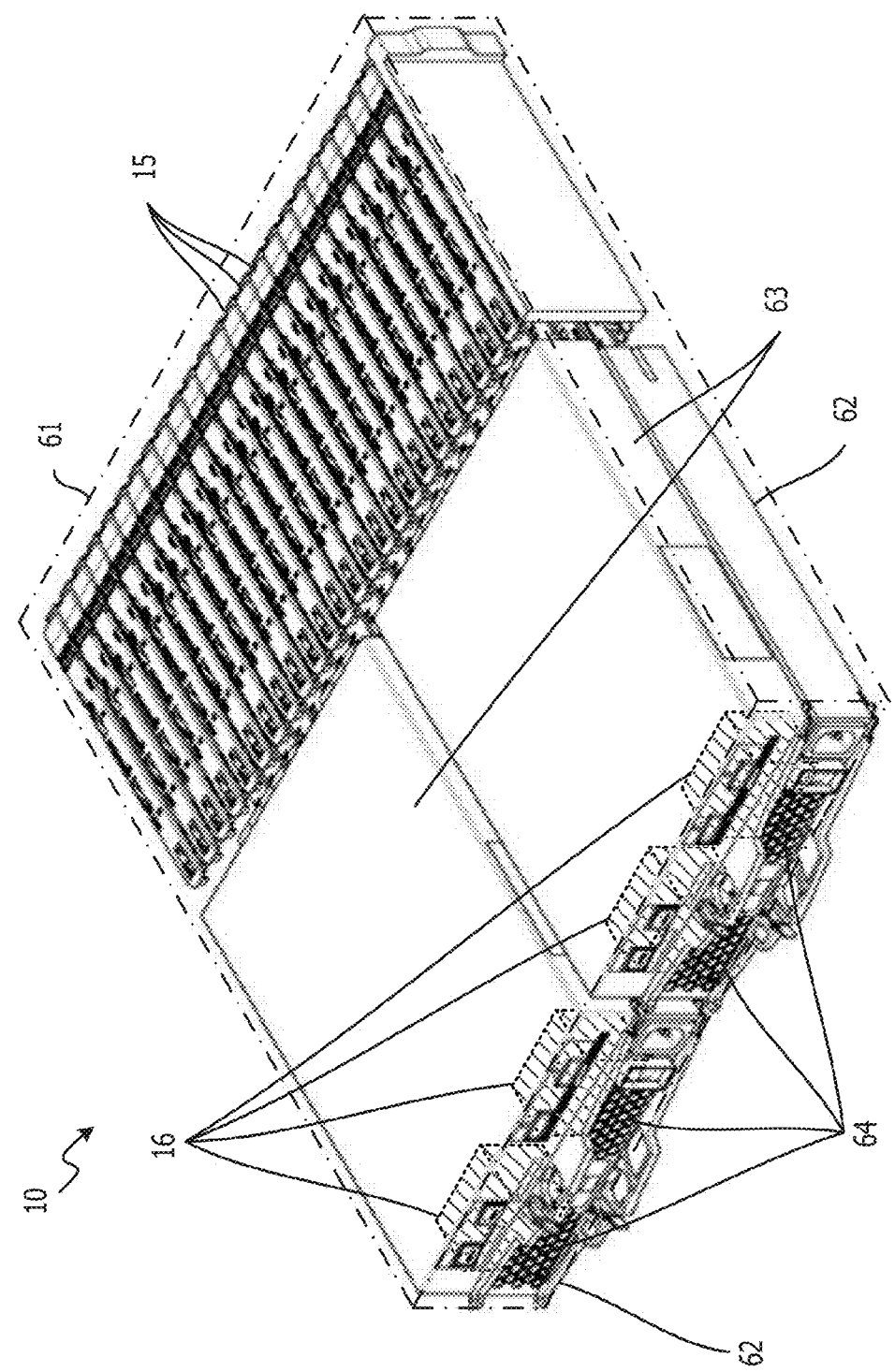
FIG. 17 is a diagram illustrating an exemplary arrangement of disks and cooling fans in a storage apparatus according to a fourth embodiment.

Next, the arrangement of the disks and cooling fans in the storage apparatus will be described with reference to FIG. 17. FIG. 17 is a diagram illustrating an exemplary arrangement of disks and cooling fans in a storage apparatus according to a fourth embodiment.

The storage apparatus 10 includes two power supply units 62, two casing monitoring controllers 63, and a plurality of disks 15 which are housed inside a casing 61. The casing monitoring controllers 63 perform monitoring control of each component within the casing 61 and, for example, have functions corresponding to that of the controller module 11.

In the storage apparatus 10, the disks 15 are arranged at a front surface side of the casing 61 and the power supply units 62 and the casing monitoring controllers 63 are arranged at a rear surface side of the casing 61. The power supply units 62 are positioned on a lower surface side of the casing 61 and the casing monitoring controllers 63 are positioned above the respective power supply units 62. The power supply units 62 each include two ventilation holes 64 and two cooling fans 16 that face the rear surface side of the casing 61 and face the respective ventilation holes 64. In addition to cooling the power supply units 62 which are a major source of heat, the cooling fans 16 create an airflow inside the casing 61 and cool the inside of the casing 61 including the disks 15. It is possible for these cooling fans 16 to be sources of vibration in the storage apparatus 10. Depending on the positional relationship between the cooling fans 16 and the disks 15, identifying a source of vibration by directly observing the vibrations is not easy.

Even in a case where it is not possible to detect vibration or resonance of a cooling fan 16 in the storage apparatus 10, the storage apparatus 10 is able to identify a cooling fan 16 that is the source of an off-track error. Thus, the storage apparatus 10 is also able to reduce deterioration of the lifetime of the disks 15 caused by the disks 15 repeatedly experiencing off-track errors. The storage apparatus 10 is also able to reduce management cost (for example, acquiring of replacement components, human cost of looking out for abnormalities and so forth) for the disks 15 of the storage apparatus 10 by reducing deterioration of the lifetime of the disks 15.

The off-track errors, which are described as an example of an error in a disk 15 that is a target of abnormal fan detection, include write off-track errors (off-track errors at the time of writing) and read off-track errors (off-track errors at the time of reading). Errors of the disks 15 that are targets of abnormal fan detection are not limited to off-track errors. Arbitrary errors of the disks 15 may be set in advance in the storage apparatus 10, as errors of the disks 15 that are to be targets of abnormal fan detection.

The storage apparatus 10 may identify an abnormal fan or an abnormal operation pattern by using a known statistical method. The storage apparatus 10 may record information such as error type, identification information of the disks 15 and the installation positions of the disks 15 along with the operation history, the error detection history, and the error counting table. In this case, the storage apparatus 10 may perform statistical processing for every condition such as error type, identification information of disks 15, installation position of disks 15 and so forth and is able to identify an abnormal fan or abnormal operation pattern using a known statistical method.

The above-described processing functions may be realized by a computer. In this case, a program is supplied in which the processing contents of functions to be possessed by the storage apparatus 10 and the storage control apparatus 1 according to the first embodiment are written. By executing the program with the computer, the processing functions are realized on the computer. The program in which the processing contents are written may be recorded on a computer-readable recording medium. Examples of a computer-readable recording medium include magnetic storage units, optical discs, magneto-optical recording media, and semiconductor memories. Examples of magnetic storage units include HDDs, flexible disks (FDs), and magnetic tapes. Examples of optical discs include DVDs, DVD-RAMs, and CD-ROM/RWs. Examples of magneto-optical recording media include magneto-optical (MO) disks.

In the case where the program is to be distributed, a portable recording medium such as a DVD or a CD-ROM on which the program is recorded is sold. The program may be stored in a storage unit of a server computer and transferred to another computer from the server computer via a network.

For example, the computer that is to execute the program stores the program recorded on a portable recording medium or transferred from a server computer in its own storage unit. Then, the computer reads the program from its own storage unit and implements the processing according to the program. The computer may directly read the program from the portable recording medium and implement the processing according to the program. In addition, the computer may sequentially implement processing according to a received program every time a program is transferred from a server computer connected via a network.

At least some of the above-described processing functions may be realized by an electronic circuit such as a DSP, ASIC, or PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus for controlling a storage apparatus including inside a casing thereof one or more storage units and two or more fans for cooling the storage units, the storage control apparatus comprising:
   a processor configured to
   obtain abnormality information regarding abnormalities in access in each of the storage units,
   switch a control state between a first control state and a second control state, the first control state corresponding to a first combination of operation modes of the fans, the second control state corresponding to a second combination of operation modes of the fans, the second combination being different from the first combination, and
   detect, among the fans, a first fan that is related to an abnormality in the storage units on basis of first abnormality information for the first control state and second abnormality information for the second control state.

2. The storage control apparatus according to claim 1, wherein
   the processor is configured to
   detect, as the first fan, a fan whose operation mode is different between in the first control state and in the second control state by comparing a first frequency of occurrence of the abnormalities in the first control state and a second frequency of occurrence of the abnormalities in the second control state.

3. The storage control apparatus according to claim 1, wherein
   the processor is configured to
   record abnormality history including the obtained abnormality information, record control state history including information of the switching between the first control state and the second control state, and detect the first fan by comparing the first abnormality information and the second abnormality information on basis of the abnormality history and the control state history.

4. The storage control apparatus according to claim 1, wherein a performance of the fans for cooling the storage units is lower in the second control state than in the first control state.

5. The storage control apparatus according to claim 1, wherein operation modes of at least two of the fans are different between in the first control state and in the second control state.

6. The storage control apparatus according to claim 1, wherein the operation modes include at least a normal operating mode, a low-speed operating mode in which rotational speed is made to be lower than that in the normal operating mode, and a stop mode in which a fan is stopped.

7. The storage control apparatus according to claim 1, wherein the processor is configured to switch a control state from the first control state to the second control state when an abnormality in access is detected a predetermined number of times.

8. The storage control apparatus according to claim 1, wherein the abnormality information includes information regarding an off-track error in the storage units.

9. A non-transitory computer-readable recording medium having stored therein a program for causing a computer to execute a process for controlling a storage apparatus including inside a casing thereof one or more storage units and two or more fans for cooling the storage units, the process comprising:

obtaining abnormality information regarding abnormalities in access in each of the storage units;

switching a control state between a first control state and a second control state, the first control state corresponding to a first combination of operation modes of the fans, the second control state corresponding to a second combination of operation modes of the fans, the second combination being different from the first combination; and detecting, among the fans, a first fan that is related to an abnormality in the storage units on basis of first abnormality information for the first control state and second abnormality information for the second control state.

10. A method for controlling a storage apparatus including inside a casing thereof one or more storage units and two or more fans for cooling the storage units, the method comprising:

obtaining, by a computer, abnormality information regarding abnormalities in access in each of the storage units;

switching a control state between a first control state and a second control state, the first control state corresponding to a first combination of operation modes of the fans, the second control state corresponding to a second combination of operation modes of the fans, the second combination being different from the first combination; and detecting, among the fans, a first fan that is related to an abnormality in the storage units on basis of first abnormality information for the first control state and second abnormality information for the second control state.

11. The storage control apparatus according to claim 1, wherein the abnormality information includes information regarding an error in writing data into one of the storage units and/or an error in reading data from one of the storage units.

* * * * *